US012697784B2

(12) United States Patent
Estelle et al.

(10) Patent No.: US 12,697,784 B2
(45) Date of Patent: Aug. 4, 2026

(54) AIR PRESSURE CONTROL IN A HOT MELT LIQUID DISPENSING SYSTEM

(71) Applicant: NORDSON CORPORATION, Westlake, OH (US)

(72) Inventors: Peter W. Estelle, Norcross, GA (US); Jeffrey E. Owen, Suwanee, GA (US); John Daniels, Dunwoody, GA (US); Scott B. Means, Lawrenceville, GA (US); Ronald M. Ramspeck, Sandy Springs, GA (US)

(73) Assignee: Nordson Corporation, Westlake, OH (US)

( * ) Notice: Subject to any disclaimer, the term of this patent is extended or adjusted under 35 U.S.C. 154(b) by 379 days.

(21) Appl. No.: 17/761,780

(22) PCT Filed: Sep. 18, 2020

(86) PCT No.: PCT/US2020/051406

§ 371 (c)(1),
(2) Date: Mar. 18, 2022

(87) PCT Pub. No.: WO2021/055687

PCT Pub. Date: Mar. 25, 2021

(65) Prior Publication Data

US 2022/0371285 A1 Nov. 24, 2022

Related U.S. Application Data

(60) Provisional application No. 62/903,575, filed on Sep. 20, 2019.

(51) Int. Cl.
B29C 64/00 (2017.01)
B05B 12/08 (2006.01)
(Continued)

(52) U.S. Cl.
CPC .......... B29C 65/522 (2013.01); B05B 12/085 (2013.01); B29C 65/4815 (2013.01)

(58) Field of Classification Search
CPC ........................... B29C 65/522; B05B 12/085
See application file for complete search history.

(56) References Cited

U.S. PATENT DOCUMENTS 6,752,323 B1    6/2004    Roos et al.
2006/0175432 A1    8/2006    Brock et al.
(Continued)

FOREIGN PATENT DOCUMENTS

CN    1806936 A    7/2006
EP    2732884 A2    5/2014
(Continued)

OTHER PUBLICATIONS

"Sigma"—https://us.kaeser.com/download.ashx?id=tcm:46-52115 (Year: 2018).*
(Continued)

*Primary Examiner* — Nicholas Krasnow
(74) *Attorney, Agent, or Firm* — BakerHostetler

(57) ABSTRACT

Systems and methods for air pressure control in a hot melt liquid dispensing system are described. An example hot melt liquid dispensing system includes a pump that pumps hot melt liquid to an applicator. The hot melt liquid dispensing system also includes an air flow path that supplies pressurized air to the pump and an electronic pressure sensor associated with the air flow path. The hot melt liquid dispensing system also includes a controller that receives an electronic signal from the electronic pressure sensor indicative of an air pressure in the air flow path and causes adjustment to the air pressure in the air flow path based on the electronic signal from the electronic pressure sensor.

16 Claims, 8 Drawing Sheets

(51) Int. Cl.
B29C 65/48 (2006.01)
B29C 65/52 (2006.01)

(56) References Cited

U.S. PATENT DOCUMENTS

| | | | |
|---|---|---|---|
| 2009/0104343 A1 | 4/2009 | Espenschied et al. | |
| 2012/0315163 A1* | 12/2012 | Yan | F04B 19/20 |
| | | | 417/375 |
| 2013/0112280 A1 | 5/2013 | Quam et al. | |
| 2014/0138399 A1 | 5/2014 | Estelle | |
| 2018/0117622 A1* | 5/2018 | Estelle | B05C 11/1005 |
| 2019/0283072 A1 | 9/2019 | Woodlief et al. | |

FOREIGN PATENT DOCUMENTS

| | | | |
|---|---|---|---|
| EP | 3315211 A1 | 5/2018 | |
| EP | 4031292 B1 | 12/2024 | |
| JP | 50-089864 A | 7/1975 | |
| JP | 07-051615 A | 2/1995 | |
| JP | 11-207228 A | 8/1999 | |
| JP | 2002-531242 A | 9/2002 | |
| JP | 2004-344695 A | 12/2004 | |
| JP | 2009-542430 A | 12/2009 | |
| JP | 2010-155215 A | 7/2010 | |
| JP | 2018-069237 A | 5/2018 | |
| WO | 2008/100726 A1 | 8/2008 | |
| WO | 2016/010597 A1 | 1/2016 | |
| WO | 2019/094282 A1 | 5/2019 | |
| WO | 2019/156772 A1 | 8/2019 | |

OTHER PUBLICATIONS

IPEA/409—International Preliminary Report on Patentability Mailed on Mar. 31, 2022 for WO Application No. PCT/US20/051406.

ISA/220—Notification of Transmittal or Search Report and Written Opinion of the ISA, or the Declaration Mailed on Jan. 14, 2021 for WO Application No. PCT/US20/051406.

"Electro-Pneumatic Regulator/Electronic Vacuum Regulator—ITV Series", Mar. 2015, p. 64.

"Instructions Manual: Adhesive Melter Micron MOD", Oct. 2016, p. 106.

"Instructions Manual: Adhesive Melter Micron Series", 2012, p. 80.

"Meler melters for adhesive and sealant application", Retrieved from https://web.archive.org/web/20150422022728/https:/www.meler.eu/products/melters/, Retrieved on Oct. 15, 2025, pp. 1-3.

"Micron MOD—Melter with piston pump and no tank", Retrieved from https://web.archive.org/web/20150423032328/https://www.meler.eu/products/melters/piston-micron-mod/, Retrieved from Oct. 16, 2025, pp. 1-6.

"Micron series—Melters with piston pump and tank", Retrieved from https://web.archive.org/web/20150422022146/http://www.meler.eu/products/melters/piston-micron-series/, Retrieved from Oct. 16, 2025, pp. 1-11.

"Micron Series: Melters with piston pump", Focke Meler Gluing Solutions, S.A.; https://www.youtube.com/watch?v=MZCUdBIwIKQ, Mar. 24, 2014, accessed online on Oct. 22, 2025.

"Modular F.R.L./Pressure Control Equipment", SMC Products, Retrieved from https://web.archive.org/web/20131210133055/http://www.smcworld.com/products/en/frl/, Retrieved from Oct. 15, 2025, pp. 1-2.

"SMC Products-Electro-Pneumatic Regulators", Retrieved from https://web.archive.org/web/20131228235435/http://www.smcworld.com/products/en/frl/s.do?ca_id=501, Retrieved on Oct. 16, 2025, pp. 1-3.

"VP-200 pressure regulator—Accessories for piston-pump melters", Retrieved from https://web.archive.Org/web/20150422030314/http://www.meler.eu/products/melters/accesories-pressure-regulator, Retrieved on Oct. 16, 2025, pp. 1-3.

"VP-200 Pressure Regulator", Gluing solutions, Aug. 2016, p. 2.

AirCom, "Catalogue 2017—Pressure & Volume Flow", 2017 English translation, p. 335.

Aircom, "Katalogue 2015—Druck & Volumenstrom (Pressure & Volume Flow)", 2015, p. 325.

Nordson, Current-to-Pressure (I/P) Run-up Transducer, Instruction Sheet, P/N 1124950_01, Feb. 2016, 20 pages.

* cited by examiner

REMOTE DEVICE 38

APPLICATOR 144

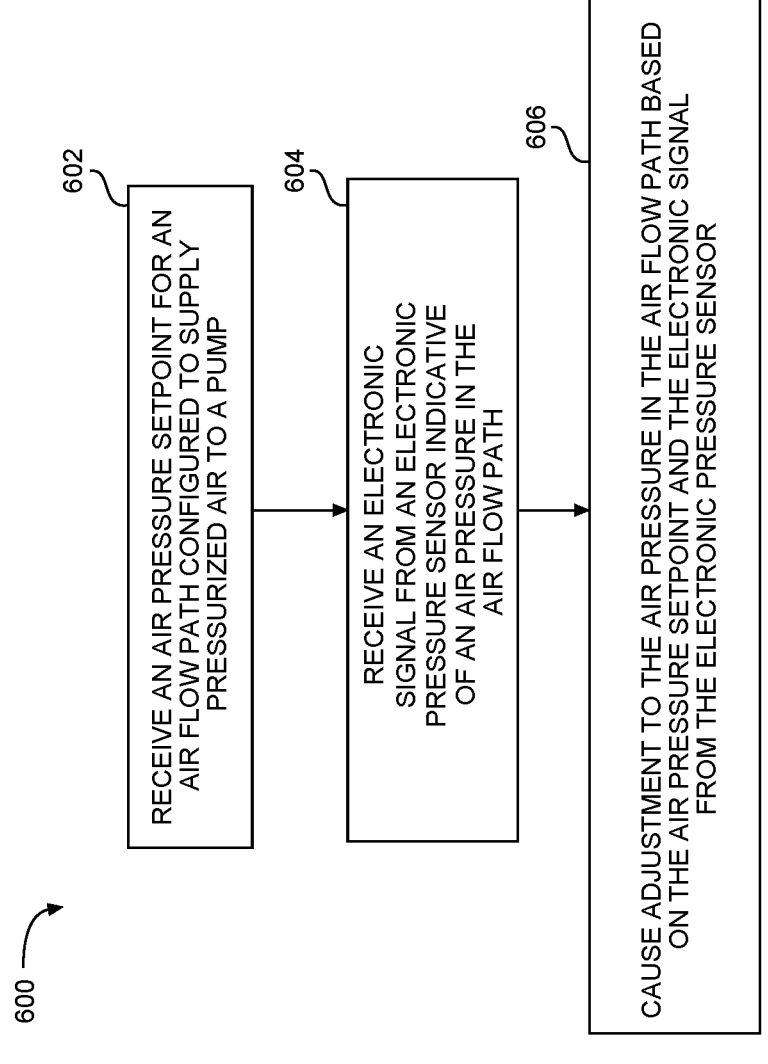

600

602
RECEIVE AN AIR PRESSURE SETPOINT FOR AN AIR FLOW PATH CONFIGURED TO SUPPLY PRESSURIZED AIR TO A PUMP

604
RECEIVE AN ELECTRONIC SIGNAL FROM AN ELECTRONIC PRESSURE SENSOR INDICATIVE OF AN AIR PRESSURE IN THE AIR FLOW PATH

606
CAUSE ADJUSTMENT TO THE AIR PRESSURE IN THE AIR FLOW PATH BASED ON THE AIR PRESSURE SETPOINT AND THE ELECTRONIC SIGNAL FROM THE ELECTRONIC PRESSURE SENSOR

FIG. 6

AIR PRESSURE CONTROL IN A HOT MELT LIQUID DISPENSING SYSTEM

CROSS-REFERENCE TO RELATED APPLICATIONS

This application is a National Stage of International Patent Application No. PCT/US2020/051406, filed Sep. 18, 2020, which claims priority to U.S. Provisional Application No. 62/903,575 filed Sep. 20, 2019, the disclosures of which are incorporated herein by reference in their entireties.

TECHNICAL FIELD

This disclosure relates generally to liquid dispensing and, more particularly, to air pressure control in a hot melt liquid dispensing system.

BACKGROUND

Hot melt liquid dispensing systems find use in a variety of applications. For example, such a system may apply hot melt adhesives during the manufacture of disposable hygiene products. As another example, a hot melt liquid dispensing system may apply hot melt adhesive to assemble and/or seal various types of packaging, such as paper-based packaging for food and beverages.

In an example configuration of a hot melt liquid dispensing system, a solid form of hot melt adhesive (or other type of hot melt material) is supplied to a melter comprising a heated reservoir and/or a heated grid to produce molten hot melt adhesive. After heating, the molten adhesive may be pumped through a heated hose to an applicator, which is sometimes referred to as a dispensing "gun" or a gun module, comprising a valve and a nozzle. The applicator then dispenses the supplied molten adhesive to the desired surface or substrate, often as a series of dots or lines. In many applications, the adhesive should be applied with precise positioning, timing, and volume. For example, an insufficient volume of dispensed adhesive may result in ineffective bonds while an excessive volume of adhesive may result in not only wasted material but also undesirable flow once the adhesive is applied to a surface.

In some hot melt liquid dispensing systems, the molten adhesive is forced to the applicator via a pump that is actuated and/or controlled by a supply of pressurized air. Since the pump affects the pressure and rate at which the molten adhesive is supplied to the applicator, it is often beneficial that the pressure of the air supplied to the pump be carefully controlled. Yet challenges remain in achieving improved air pressure control in hot melt liquid dispensing systems. For example, a system that relies on manual mechanical adjustments to air pressure may have a number of drawbacks. For example, this method may be subject to human error or insufficient operator attention. An operator may make un-authorized changes to the air pressure or may be inadequately trained for the task. A system that relies on manual mechanical pressure adjustments may also suffer from a lack of repeatability—even the most diligent operator is unlikely to be able to set the air pressure at the same value time after time, and with the utmost precision and accuracy. In addition, the position of a hot melt liquid dispensing system within a production facility may make physical access to air pressure adjustment mechanisms difficult or even dangerous due to the high temperature parts and material in the area.

These and other shortcomings are addressed in the present disclosure.

SUMMARY

Disclosed herein are system and methods for air pressure control in a hot melt liquid dispensing system.

An example hot melt liquid dispensing system comprises a pump configured to pump hot melt liquid to an applicator. The hot melt liquid dispensing system further comprises an air flow path configured to supply pressurized air to the pump and an electronic pressure sensor associated with the air flow path. The hot melt liquid dispensing system further comprises a controller configured to receive an electronic signal from the electronic pressure sensor indicative of an air pressure in the air flow path and cause adjustment to the air pressure in the air flow path based on the electronic signal from the electronic pressure sensor.

In an example method for air pressure control in a hot melt liquid dispensing system, an electronic signal is received from an electronic pressure sensor associated with an air flow path configured to supply pressurized air to a pump of the hot melt liquid dispensing system. The electronic signal is indicative of an air pressure in the air flow path. An adjustment is caused to the air pressure in the air flow path based on the electronic signal from the electronic pressure sensor.

An example controller comprises one or more processors and memory storing instructions that, when executed by the one or more processors, cause the controller to receive an electronic signal from an electronic pressure sensor indicative of an air pressure in an air flow path configured to supply pressurized air to a pump of a hot melt liquid dispensing system. The instructions, when executed by the one or more processors, further cause the controller to cause adjustment to the air pressure in the air flow path based on the electronic signal from the electronic pressure sensor.

BRIEF DESCRIPTION OF DRAWINGS

The accompanying drawings, which are incorporated in and constitute a part of this specification, illustrate embodiments and together with the description, serve to explain the principles of the methods and systems:

FIG. 6 illustrates a method flow diagram according to an embodiment of the present disclosure.

Aspects of the disclosure will now be described in detail with reference to the drawings, wherein like reference numbers refer to like elements throughout, unless specified otherwise.

DETAILED DESCRIPTION

Figure 1A:
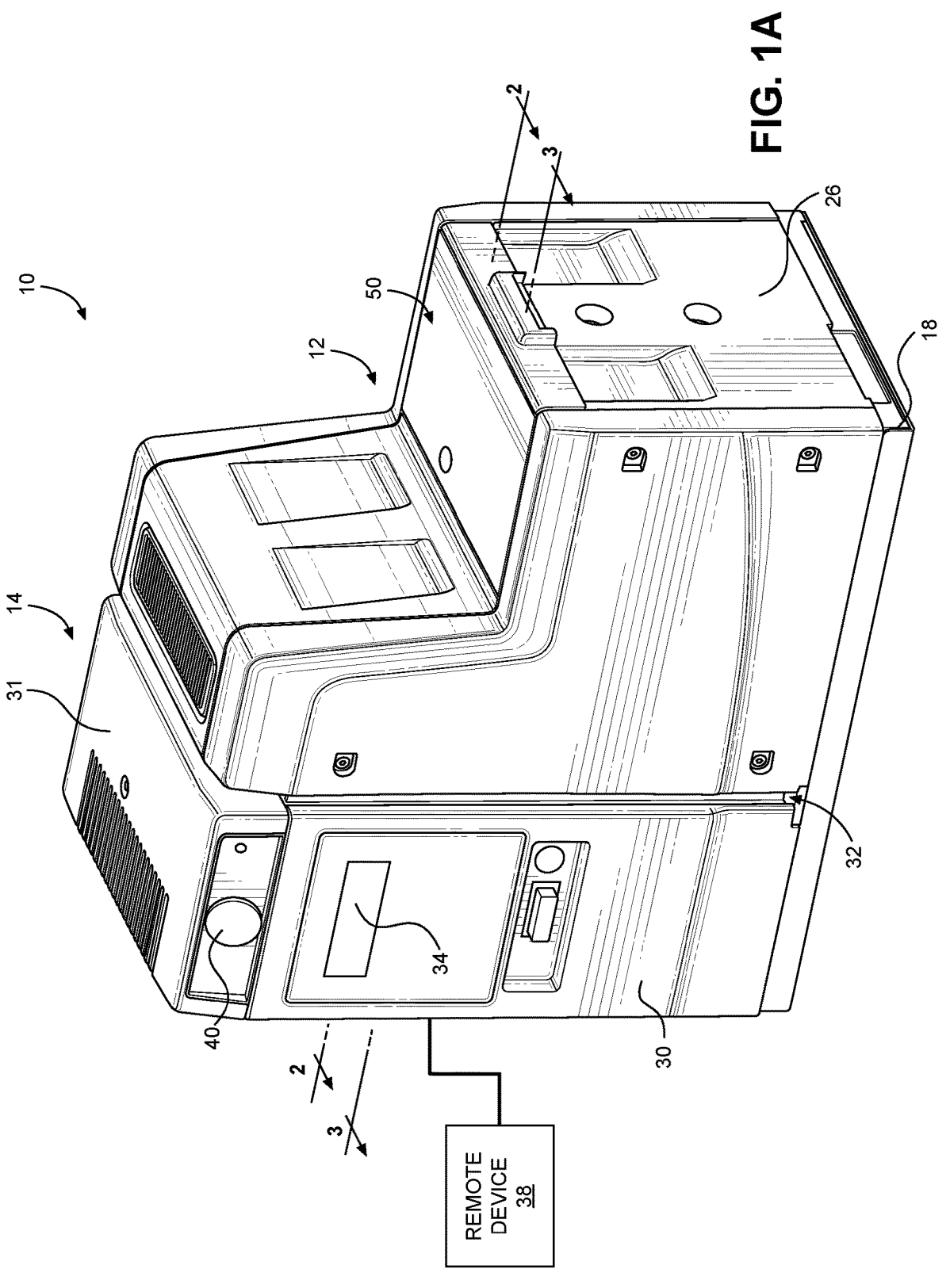
FIG. 1A illustrates a perspective view of an adhesive dispensing device according to an embodiment of the present disclosure.
Figure 1B:
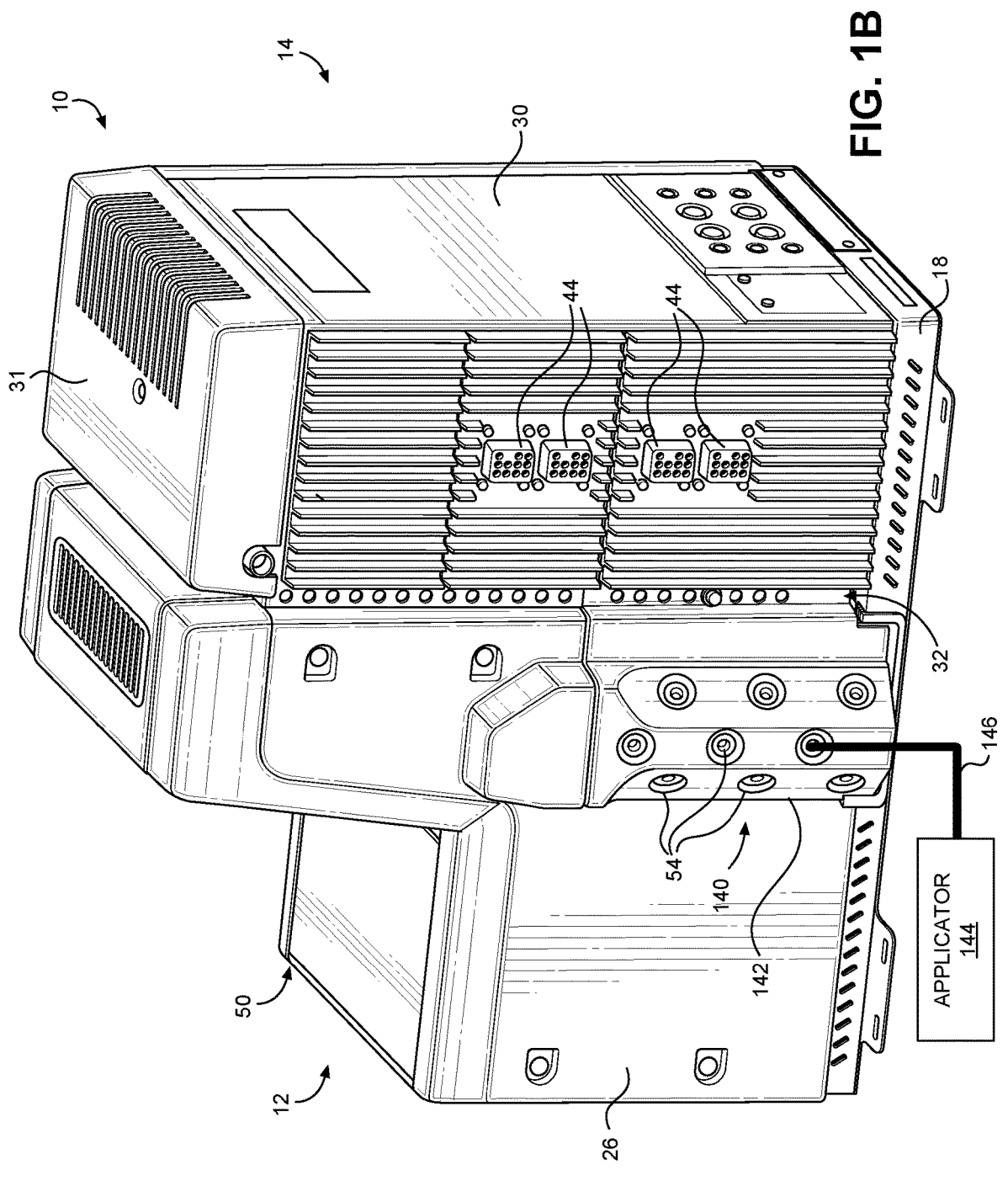
FIG. 1B illustrates an alternative perspective view of the adhesive dispensing device shown in FIG. 1A.

The systems and methods of the present disclosure relate to air pressure control in a hot melt liquid dispensing system.

Referring to FIGS. 1A-4, an adhesive dispensing device 10 in accordance with one embodiment of the invention is shown. The adhesive dispensing device 10 includes a melt module 12 and a control module 14 electrically and/or physically coupled to the melt module 12. The melt module 12 is configured to include the components related to receiving solid adhesive and melting the solid adhesive, whereas the control module 14 is configured to include the electronic components for controlling operation of the melt module 12, where each of the melt module 12 and the control module 14 will be described in detail further below. Each of the melt module 12 and the control module 14 may be mounted to and supported by a base 18. The base 18 may comprise a metal body and is configured to releasably couple to each of the melt module 12 and the control module 14, such as through fasteners that may comprise bolts, screws, etc., though it is contemplated that the melt module 12 and the control module 14 may be alternatively coupled to the base 18 in other embodiments.

When the melt module 12 and the control module 14 are coupled to the base 18, a thermal gap 32 may be defined between the melt module 12 and the control module 14. The thermal gap 32 may be configured to minimize and/or substantially eliminate heat transfer from the melt module 12 to the control module 14 so as to prevent damage to the electronic components contained by the control module 14 caused by the heat created by the melt module 12. The thermal gap 32 may comprise a space between the melt module 12 and the control module 14. Additionally, it is contemplated that the thermal gap 32 may further include materials configured to prevent heat transfer, such as various types of insulation, though any specific type of material or structure is not required.

Figure 1C:
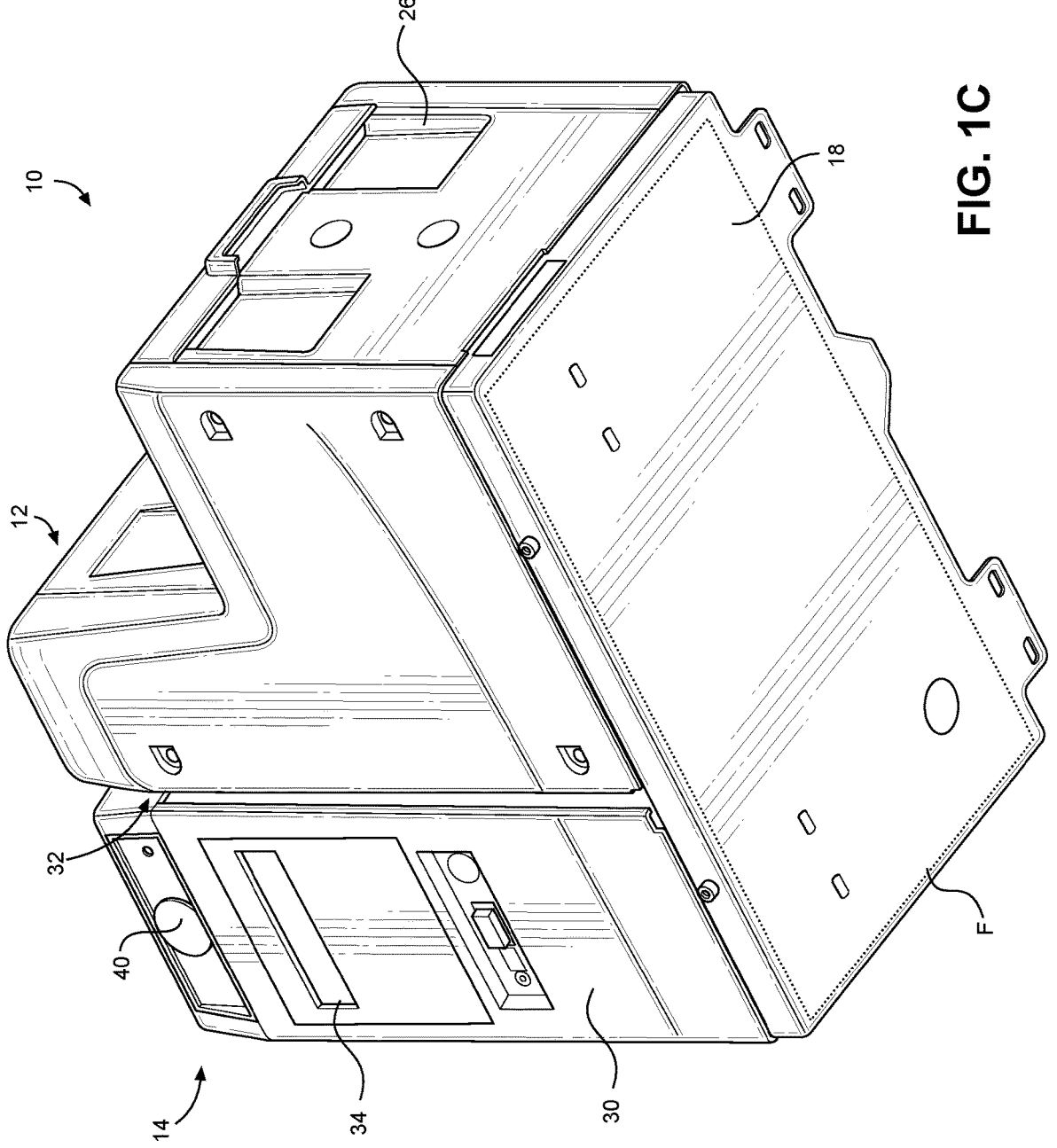
FIG. 1C illustrates another alternative perspective view of the adhesive dispensing device shown in FIG. 1A.
Figure 2:
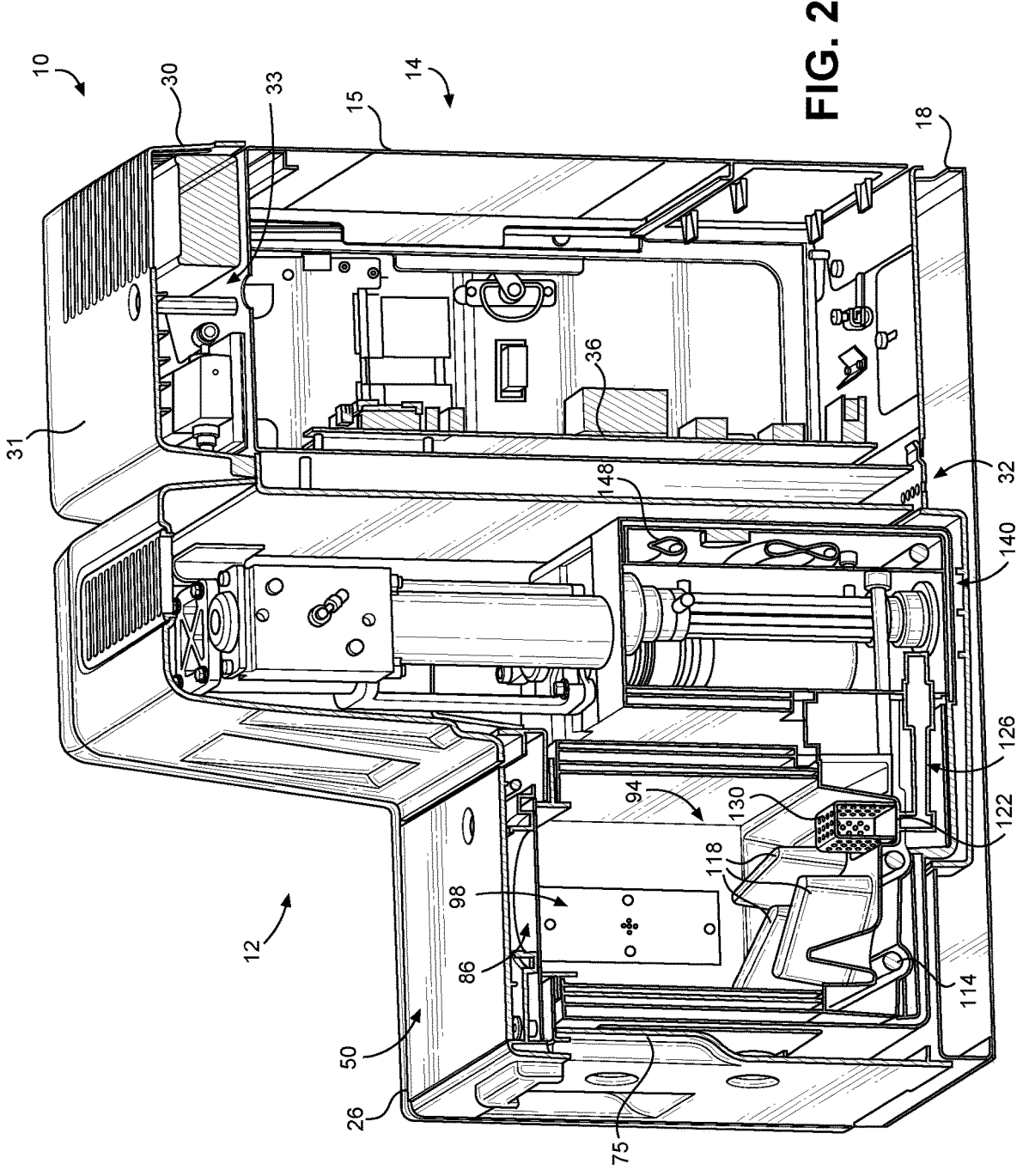
FIG. 2 illustrates a cross-sectional view of the adhesive dispensing device shown in FIG. 1A, taken along line 2-2 shown in FIG. 1A.
Figure 3:
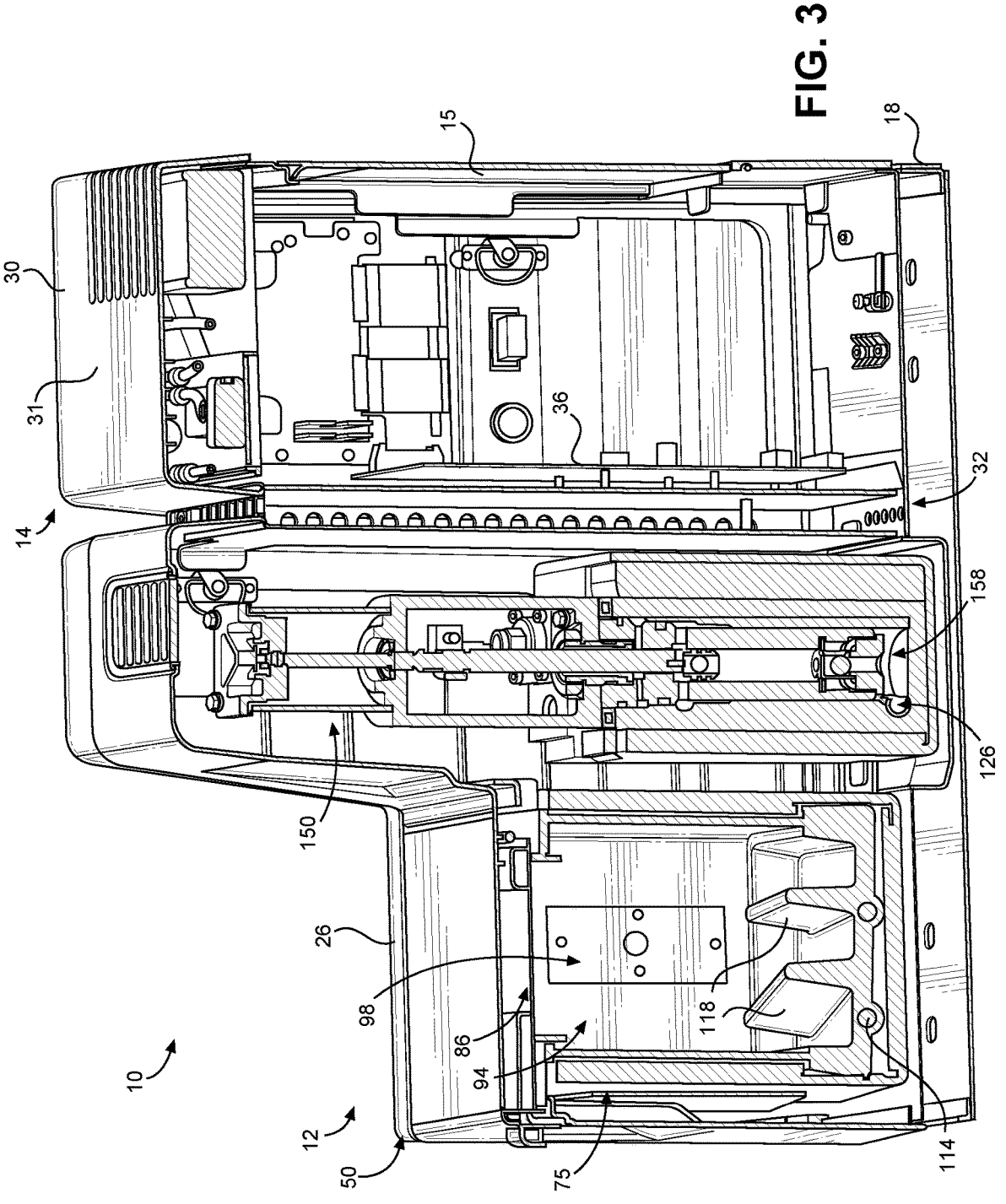
FIG. 3 illustrates an alternative cross-sectional view of the adhesive dispensing device shown in FIG. 1A, taken along line 3-3 shown in FIG. 1A.

As shown in FIG. 1C, the adhesive dispensing device 10 may define a specific footprint F. The lower end of the base 18 may define the footprint F, which may be defined as a cross-sectional shape and area defined by the lower end of the base 18. The footprint F may be additionally or alternatively defined by the collective lower ends of the melt module 12 and the control module 14.

The adhesive dispensing device 10 may include a melt module cover 26 and a control module cover 30 configured to provide selective access to the melt module 12 and the control module 14, respectively. The melt module cover 26 is configured to house the components of the melt module 12 and at least partially insulate the melt module 12 from the surrounding environment, while the control module cover 30 is configured to house the components of the control module 14, as well as insulate the control module 14 from the melt module 12 and the surrounding environment. The control module cover 30 includes a top cover 31, which is separately removable from the other portions of the control module cover 30. The previously-described thermal gap 32 may be specifically defined between the melt module cover 26 and the control module cover 30.

The control module 14 may include a controller 36 disposed within a controller housing 15. The controller 36 may comprise any suitable computing device configured to host a software application for monitoring and controlling various operations of the adhesive dispensing device 10 as described herein. It will be understood that the controller 36 may include any appropriate integrated circuit. Specifically, the controller 36 may include a memory and be in signal communication with a human-machine interface (HMI) device 34. The memory may be volatile (such as some types of RAM), non-volatile (such as ROM, flash memory, etc.), or a combination thereof. The controller 36 may include additional storage (e.g., removable storage and/or non-removable storage) including, but not limited to, tape, flash memory, smart cards, CD-ROM, digital versatile disks (DVD) or other optical storage, magnetic tape, magnetic disk storage or other magnetic storage devices, universal serial bus (USB) compatible memory, or any other medium which may be used to store information and which may be accessed by the controller 36. The memory of the controller 36 may be configured to store and recall on demand various metering operations to be performed by the adhesive dispensing device 10. The control module 14 may further include electrical connections 44 extending through the control module cover 30, which may be configured to establish a connection with an applicator and/or heated hose so as to transmit power to the applicator and/or hosed hose and exchange communication signals.

As noted above, the control module 14 may include an HMI device 34 in signal communication with the controller 36. In the depicted embodiment, the HMI device 34 may include a display, such as an OLED screen. However, it is contemplated that the HMI device 34 may also include, in addition or alternatively, various types of inputs that provide the ability to control the controller 36, via, for example, buttons, soft keys, a mouse, voice actuated controls, a touch screen, movement of the controller 36, visual cues (e.g., moving a hand in front of a camera on the controller 36), or the like. The HMI device 34 may provide outputs via a graphical user interface, including visual information, such as the visual indication of the current conditions within the adhesive dispensing device 10, as well as acceptable ranges for these parameters via a display. Other outputs may include audio information (e.g., via speaker), mechanically (e.g., via a vibrating mechanism), or a combination thereof. In various configurations, the HMI device 34 may include a display, a touch screen, a keyboard, a mouse, a motion detector, a speaker, a microphone, a camera, or any combination thereof. The HMI device 34 may further include any suitable device for inputting biometric information, such as, for example, fingerprint information, retinal information, voice information, and/or facial characteristic information, for instance, so as to require specific biometric information for accessing the controller 36. In addition to the HMI device 34, the control module 14 may include a pressure dial 40 for easily displaying pressure readings, such as air pressure readings.

Additionally, the controller 36 may be in signal communication with a remote device 38 (shown in schematic in FIG. 1A) spaced from the control module 14. In one embodiment, the remote device 38 may comprise a display spaced from the control module 14, such as an OLED display, though various types of conventional displays are contemplated. Alternatively, the remote device 38 may comprise an external computing device, examples of which include a processor, a desktop computing device, a server computing device, or a portable computing device, such as a laptop, tablet, or smart phone. Accordingly, the remote device 38 may provide the operator with the ability to interact with and control the controller 36 at a distance from the adhesive dispensing device 10. The remote device 38 may be used as part of a cloud control system for the adhesive dispensing device 10. The remote device 38 may comprise a PLC (programmable logic controller) or factory computer.

The melt module 12 will be described in greater detail. The melt module 12 comprises a melter subassembly 75 configured to receive solid or semi-sold pellets of adhesive material, either from manual filling by opening a lid assembly 50 or through an automatic fill mechanism. The melter subassembly 75 may heat the pellets to a specified temperature to form molten adhesive. The melt module 12 may also include a pump 150 configured to pressurize and dispense the molten adhesive to one or more downstream applicators 144 (shown in schematic in FIG. 1B). An applicator 144 may also be known as a dispenser gun. An applicator 144, as used herein, may refer to an applicator module configured with a bank of applicators.

The melt module 12 may include a manifold 140 configured to receive pressurized molten adhesive from the pump 150 and distribute said adhesive to one or more outputs 54 at an external portion of the manifold 140. The manifold 140 and some portions of the pump 150 may be integrated as a single structural component (e.g., a manifold block). For example, a fluid chamber 158 portion of the pump 150 may extend into such a common structural component to supply the manifold 140 portions with pressurized molten adhesive. The manifold 140 may be configured with one or more heaters 148 (e.g., heating elements) to maintain the adhesive flowing through the manifold 140 at a specified temperature. The heaters 148 may also serve to re-melt any adhesive material that has cooled within the manifold 140.

The manifold 140 may include an external manifold cover 142 with openings for the outputs 54. The manifold cover 142 may be integral with the manifold 140 or may be separately attachable and detachable. A heated hose 146 may be attached to an output 54 to receive pressurized molten adhesive from the manifold 140 and carry the adhesive to an applicator 144 for dispensing. The applicator 144 and heated hose 146 may be each configured with one or more heaters to maintain the adhesive at a specified temperature. The heaters of the applicator 144 and heated hose 146 may also serve to re-melt any adhesive material that has cooled within the component. The heaters of the applicator 144 and heated hose 146, as well as the heater 148 of the manifold 140, may be in signal communication with the controller 36 to transmit status information (e.g., temperature readings) to the controller 36 and receive control signals from the controller 36. When not connected to an applicator 144, each of the plurality of outputs 54 may be sealed using a plug.

The melt module 12 may comprise a melter subassembly 75, which may define a receiving space 94 that is configured to receive solid material, as well as contain adhesive that has melted. The top wall of the melter subassembly 75 may define an opening 86 in communication with the receiving space 94, such that when the lid assembly 50 is pivoted to an open position, material may be manually deposited into the receiving space 94 through the opening 86, but when the lid assembly 50 is in a closed position, the lid assembly 50 may block introduction of adhesive into the receiving space 94 through the opening 86. The receiving space 94 may define a specific volume that is designed for a particular adhesive operation. For example, the receiving space 94 may be configured to receive 4 kg of adhesive, though other sizes are contemplated.

The melter subassembly 75 may further include a level sensor 98 disposed within the receiving space 94. Particularly, the level sensor 98 may be attached to the inner surface of one of the sidewalls of the melter subassembly 75 and may be in signal communication with the controller 36 of the control module 14. The level sensor 98 may comprise a capacitive level sensor, though other types of level sensors are contemplated. In operation, the level sensor 98 may monitor the level of material within the receiving space 94 and send signals to the controller 36 that are indicative of the adhesive level.

The melter subassembly 75 may further include a heater 114 configured to melt the adhesive. Though depicted as attached to and at least partially extending through the base of the melter subassembly 75, the heater 114 may alternatively or additionally be attached to any portion of the melter subassembly 75. It will be appreciated that the heater 114 may comprise any type of known heating device configured to melt adhesive within a melter assembly. The melter subassembly 75 may further include a plurality of fins 118 extending upwards from the base and into the receiving space 94, where the fins 118 are configured to be heated by the heater 114 and provide an increased surface area for heating and melting the adhesive. Though a particular number, arrangement, and configuration of the fins 118 is shown, it is contemplated that the fins 118 may be alternatively configured as desired. Additionally, an outlet 122 may be defined in the base and in fluid communication with the receiving space 94, where melted adhesive is configured to flow through the outlet 122 and exit the receiving space 94. A cage 130 may be positioned adjacent the outlet 122, where the cage 130 is configured to act as a filter to prevent adhesive pieces of a particular size that are not melted from reaching the outlet 122, as such adhesive pieces may congeal around and clog the outlet 122.

A passage 126 may extend from the outlet 122 to the pump 150 to supply the pump 150 with molten adhesive from the melter subassembly 75. The pump 150 may be a double-acting piston pump, though other types of pumps are contemplated. The pump 150 may be actuated according to a pressurized air supply. The pump 150 may operate to expel the molten adhesive from one or more of the outputs 54 via the manifold 140. The pump 150 may be controlled by the controller 36 of the control module 14 to deliver the desired flow rate of molten adhesive through the outputs 54. The controller 36 may regulate the air supply to the pump 150 (e.g., air pressure) to effectuate, at least in part, the desired operation of the pump 150.

Figure 4:
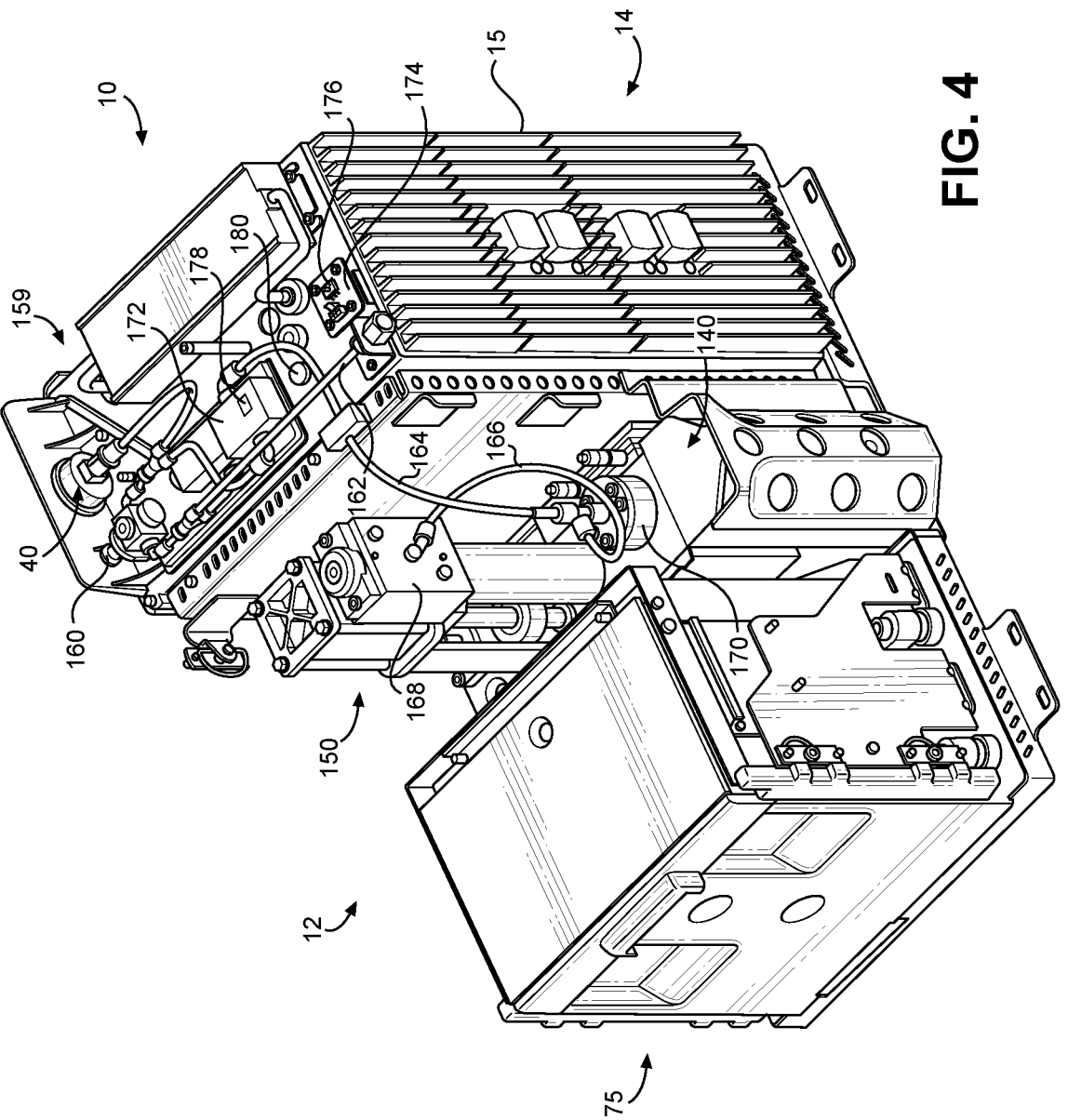
FIG. 4 illustrates an alternative perspective view of the adhesive dispensing device shown in FIG. 1A with some external cover portions hidden.

With particular attention to FIG. 4, which illustrates a view of the adhesive dispensing device 10 with various covers, etc. hidden, the adhesive dispensing device 10 comprises a pressure control assembly 159 relating to air pressure control. The pressure control assembly 159 is generally (although not exclusively) housed within a space 33 (see FIG. 2) defined between the top cover 31 of the control module cover 30 and the controller housing 15. The pressure control assembly 159 comprises a regulator 172, a pressure control board 174, a manual adjustment mechanism 160, the pressure dial 40, and various air lines (e.g., tubing or hoses) and electrical connections. It will be noted that not all electrical connections or air lines are necessarily shown in the Figures, including FIG. 4.

Generally, the regulator 172 may receive pressurized air from an external air supply via an input air line 162. An air filter (not shown) may be attached to the external inlet of the input air line 162. The external air supply may comprise a plant air supply. The regulator 172 may adjust the pressure (and/or other parameters) of the un-regulated input air supply as needed and output the regulated air supply to a pump air valve 168 via an air line 164, a pressure discharge valve 170, and an air line 166. The pump air valve 168 may cause actuation of the pump 150. For example, in the case of a pneumatically-actuated double-acting piston pump, the pump air valve 168 may direct air into either an upper or lower portion of the associated air cylinder to cause a piston stroke. The pressure discharge valve 170 may allow for pressurized molten adhesive within the pump 150 and manifold 140 to be bypassed back to the melter subassembly 75 when the pressurized air supply is removed, such as when the pump 150 is shut down.

As noted, the pressure control assembly 159 (or portions thereof) may be generally configured to control the pressure and/or other parameters of the pressurized air supplied to the pump 150 to cause actuation of the pump 150. The pressure control assembly 159 may be configured for automated air pressure control via the controller 36 and/or the remote device 38. The air pressure control may be additionally or alternatively based on user input, such as user input received via the HMI device 34 or the remote device 38.

The pressure control assembly 159 may regulate the pressure of the air supply to the pump 150 based on pressure sensor readings from one or more pressure sensors positioned in the air supply flow path, such as the pressure sensor 180. The one or more pressure sensors may comprise an electronic pressure sensor configured to output an electrical pressure signal (e.g., digital or analog), such as a digital pressure transducer sensor or a pressure-to-current (or voltage) transducer. Although the connection to the air flow path is not shown in FIG. 4, the pressure control board 174 comprises a digital on-board pressure sensor 176, for example. Digital pressure readings may be sent to the controller 36, the pressure control board 174, and/or the regulator 172 for control processing.

The pressure of the air supply may be controlled based on pressure measurements of un-regulated (e.g., upstream) air supply in the air flow path, such as measurements from a pressure sensor (not shown) in the input air line 162 before the regulator 172. Pressure control may be additionally or alternatively based on pressure measurements in the air flow path downstream from pressure regulation elements (e.g., the regulator 172). For example, pressure control may be based on pressure measurement from the pressure sensor 180 in the air line 164 and/or a pressure sensor (not shown) in the air line 166. Downstream and/or upstream air pressure measurements may also be taken by one or more sensors at or in the regulator 172. Downstream pressure measurements may be used to establish closed loop control of the air pressure.

The regulator 172 may control the pressure of the air supply to the pump 150 (e.g., the pump air valve 168) via a pressure transducer 178. The pressure transducer 178 may be configured to receive an electronic signal (e.g., analog or digital) and provide a proportional (e.g., linear) pneumatic output to the air flow path. The pressure transducer 178 may comprise a current-to-pressure transducer, a voltage-to-pressure transducer, or a similar device that converts an electronic signal to pressure. Although depicted as part of the regulator 172, the pressure transducer 178 may be positioned elsewhere in the pressure control assembly 159 or the adhesive dispensing device 10 generally.

The regulator 172 may be configured to selectively enable or disable the downstream air supply to the pump 150. For example, the regulator 172 may be configured with a solenoid valve operable to selectively open or close an output air flow from the regulator 172.

The pressure control assembly 159 further comprises the manual adjustment mechanism 160 and the pressure dial 40. The manual adjustment mechanism 160 provides an alternative method to adjust the pressure of the air supply to the pump 150. An operator may manipulate the manual adjustment mechanism 160 with a hex tool, screwdriver, or the like to make manual adjustments to the air pressure. The operator may observe the pressure dial 40 while doing so. Although it is noted that this manual adjustment method may present challenges in performing accurate, precise, and repeatable adjustments. Physical access to the manual adjustment mechanism 160 and/or dangerous exposure to nearby heated parts may also frustrate such manual pressure control.

Figure 5:
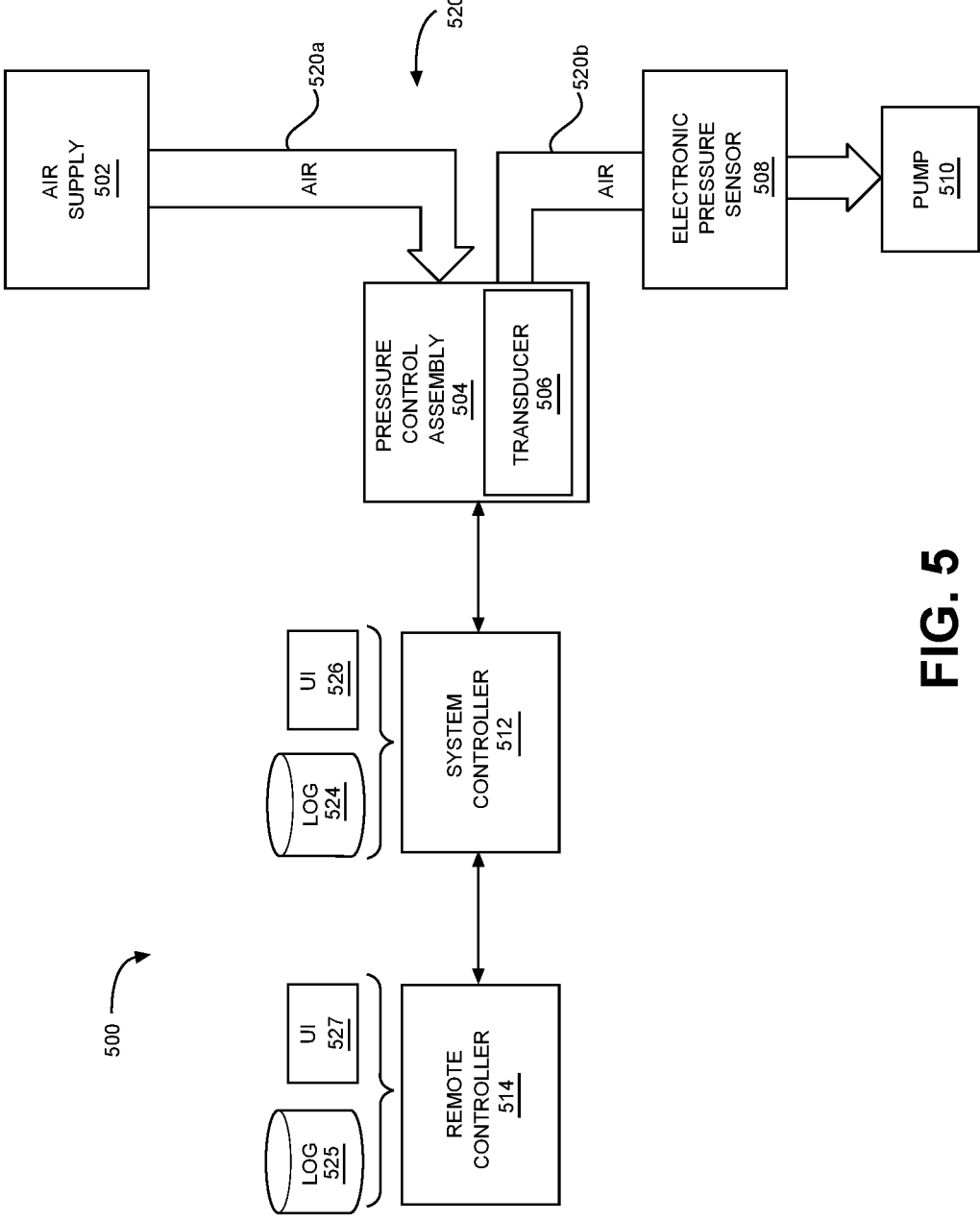
FIG. 5 illustrates a schematic diagram of a hot melt liquid dispensing system configuration according to an embodiment of the present disclosure.

FIG. 5 illustrates a schematic diagram 500 of an example air pressure control configuration for a hot melt liquid dispensing system (e.g., the adhesive dispensing device 10 of FIGS. 1A-4 and/or associated systems and devices). In the example configuration, a pressurized air flow path 520 is provided to a pump 510 from an air supply 502. The air flow path 520 passes through (or is otherwise acted upon by) a pressure control assembly 504 (e.g., the pressure control assembly 159 of FIG. 4) to control the pressure of the air flow path 520 to the pump 510. The portion of the air flow path 520 after the pressure control assembly 504 shall be referred to as the downstream (or regulated) air flow path 520b and the portion of the air flow path 520 before the pressure control assembly 504 shall be referred to as the upstream (or un-regulated) air flow path 520a.

An electronic pressure sensor 508 is positioned in the downstream air flow path 520b to take pressure measurements and transmit those pressure measurements to a system controller 512 and/or remote controller 514. The system controller 512 and/or remote controller 514 may cause the pressure control assembly 504 to adjust the pressure of the air flow path 520 based on the downstream pressure measurements from the electronic pressure sensor 508. For example, a transducer 506 of the pressure control assembly 504 may cause adjustments to the air pressure of the downstream air flow path 520, such as based on an electronic signal sent to the transducer 506.

The air supply 502 may comprise a pressurized external air supply, such as a plant air supply. The air supply 502 may be received via an input air line of the dispensing system. The upstream air flow path 520a may be received at the pressure control assembly 504. The pressure control assembly 504 may comprise a regulator device (e.g., the regulator 172 of FIG. 4) configured to adjust the air pressure of the air flow path 520 to achieve a desired air pressure in the downstream air flow path 520b. The regulator may comprise the transducer 506 (e.g., the pressure transducer 178 of FIG. 4), which may be used to adjust the air pressure in the air flow path 520. The transducer 506 may be configured to cause an air pressure adjustment based on an electronic signal transmitted to the transducer 506, such as from the system controller 512, the remote controller 514, or another component of the pressure control assembly 504. The transducer 506 may comprise a current-to-pressure transducer, a voltage-to-pressure transducer, or a similar type of transducer.

The system controller 512 and/or the remote controller 514 may receive one or more pressure measurements from the electronic pressure sensor 508. The one or more pressure measurements may be received as electronic signals (analog or digital) generated by the electronic pressure sensor 508. The electronic signals from the electronic pressure sensor 508 may be indicative of the air pressure in the air flow path 520b. The electronic pressure sensor 508 may comprise a digital pressure transducer sensor or a pressure-to-current (or voltage) transducer. Based on an air pressure setpoint (e.g., a setpoint range) and the one or more pressure measurements from the electronic pressure sensor 508, the system controller 512 and/or remote controller 514 may determine a pressure adjustment for the incoming upstream air flow path 520a. For example, the current pressure measurement may be compared to the air pressure setpoint or setpoint range to determine the necessary adjustments, if any. Other control algorithms or techniques may be used, such as a closed loop controller (e.g., a PID controller). The system controller 512 and/or remote controller 514 may send an electronic signal to the pressure control assembly 504 (e.g., the transducer 506) to effectuate the pressure adjustment. The pressure adjustment preferably brings the air pressure of the downstream air flow path 520b to the pressure setpoint or within the pressure setpoint range.

The system controller 512 may be integrated with or connected to an adhesive dispensing device of the dispensing system (e.g., the controller 36 of FIGS. 2 and 3), although it is not so limited. For example, the system controller 512 may comprise a PLC or other computing or logic device at a facility. The remote controller 514 (e.g., the remote device 38 of FIG. 1A) may be located external to the dispensing system. For example, the remote controller 514 may comprise a cloud or server-based controller. The remote controller 514 may comprise a remote personal computing device (e.g., a laptop, tablet, smartphone, or desktop computer) that is in communication with the dispensing system via a cloud or server system. The remote controller 514 may comprise a PLC or other similar device at a facility. The various control logic, user interface, and other functions described herein may be implemented by either or both of the system controller 512 or remote controller 514, in varying combinations and degrees.

The system controller 512 and remote controller 514 may provide respective user interfaces 526, 527 (e.g., graphical user interfaces) to facilitate interaction between an operator (local or remote) and the dispensing system. For example, a user interface may enable the operator to input an air pressure setpoint. By inputting the air pressure setpoint via a user interface, the operator is able to enter this setpoint as a precise numerical value, rather than the imprecise trial-and-error method using a mechanical adjustment mechanism and analog pressure dial. As another example, a user interface may display a present air pressure reading to the operator. A user interface may also display one or more past air pressure readings. In this regard, a user interface offers greater precision and accuracy than an analog pressure dial in displaying a present air pressure reading. This advantage is further enhanced by the electronic pressure sensor 508, which provides more accurate and precise pressure measurements than a counterpart analog pressure sensor.

In addition, an interactive user interface on the remote controller 514 (and/or the system controller 512 in some configurations) may enable remote operator oversight and control of the dispensing system's air pressure parameters (as well as other system parameters). As discussed above, it often may be difficult or even dangerous for an operator to gain physical access to manual air pressure adjustment mechanisms. Yet remote control via the system controller 512 and/or remote controller 514 may largely eliminate these challenges. This arrangement may also enable centralized control over multiple dispensing systems so-configured. A remote or off-floor operator may simultaneously monitor and control the multiple dispensing systems via respective remote user interfaces without having to repeatedly move from dispensing system to dispensing system on a production floor.

By virtue of the electronic nature of the pressure adjustments by the transducer 506 and the pressure measurements from the electronic pressure sensor 508, the system controller 512 and/or remote controller 514 may efficiently create and store correlated records of such pressure adjustments (e.g., the electronic control signals to the transducer 506) and measurements (e.g., the electronic signals from the electronic pressure sensor 508). Records for air pressure setpoints may also be created and stored. The pressure adjustment, pressure measurement, and/or pressure setpoint records may be displayed on a user interface of the system controller 512 and/or remote controller 514 for efficient operator review.

The records may also be used in various types of data analytics and control algorithms. For example, analysis of the pressure adjustment records and the pressure measurement records may reveal a trend in the relationship between pressure adjustments and corresponding pressure measurements. The trend may be indicative of a system malfunction, such as a loose or leaking air hose. The records may also be used for purposes of quality control. For example, a substandard batch of products may be traced back to an incorrectly entered air pressure setpoint or out-of-threshold pressure measurements. In addition, product quality control metrics may be analyzed with corresponding pressure setpoint, pressure adjustment, and/or pressure measurement records to identify any correlating relationships. For example, a certain pressure setpoint that historically correlates to high quality product batches may be identified and used again for the same or similar operations. As noted above, this identified pressure setpoint may be easily entered via the user interface and implemented by the electronically-controlled transducer 506. The above records may be implemented as the logs 524, 525 on the system controller 512 and the remote controller 514, respectively.

FIG. 6 illustrates a method flow diagram for a method 600 for air pressure control in a hot melt liquid dispensing system ("dispensing system"), such as the adhesive dispensing device 10 of FIGS. 1A-4 and associated systems and components. The method 600 may be performed, at least in part, by a controller associated with the dispensing system. The controller may be a local controller or a remote controller. The dispensing system may comprise a pump configured to pump hot melt liquid to an applicator associated with the dispensing system. The hot melt liquid may be received from a melter of the dispensing device.

The dispensing system may comprise an air flow path configured to supply pressurized air to the pump. The air flow path may originate at an input air line that receives air from an external air supply, such as a plant air supply. The air flow path may comprise various air lines of the dispensing system and terminate at the pump. For example, the air flow path may terminate at an air valve for the pump. The pump may be pneumatically actuated by the pressurized air from the air flow path.

The dispensing system may comprise an electronic pressure sensor associated with the air flow path. The electronic pressure sensor may be configured to measure the air pressure in the air flow path. The electronic pressure sensor may be configured to transmit an electronic signal indicative of the measured air pressure in the air flow path. The electronic pressure sensor may comprise a pressure-to-current transducer or a pressure-to-voltage transducer. The dispensing system may comprise a pressure control assembly configured to control the pressure in the air flow path. For example, the pressure control assembly may be configured to raise or lower the pressure of the air in the portion of the air flow path downstream from the pressure control assembly. The pressure control assembly may comprise a transducer operable to adjust the pressure in the air flow path. The transducer may comprise a current-to-pressure transducer or a voltage-to-pressure transducer. The transducer may be operable to adjust air pressure based on an electronic signal sent to and received by the transducer.

At step 602, an air pressure setpoint for the air flow path is received, such as by a controller of the dispensing system. The pressure setpoint may be received via a user interface associated with the dispensing system. For example, an operator may enter the pressure setpoint into the user interface. The user interface may be local to the dispensing system. Additionally or alternatively, the pressure setpoint may be received from a remote device, such as a remote controller. The pressure setpoint may be received via a user interface of the remote device. The pressure setpoint may comprise a pressure setpoint range. In some embodiments, the pressure setpoint may be already set or received at the dispensing system, in which case the method 600 may begin at step 604.

At step 604, an electronic signal is received from the electronic pressure sensor associated with the air flow path. The electronic signal may be indicative of the air pressure in the air flow path. The electronic signal may be received by the controller, for example. The electronic signal may comprise an electric current or voltage signal generated based on pressure to the electronic pressure sensor. The measured air pressure in the air flow path may be displayed to an operator or other interested party. For example, the air pressure may be displayed on a user interface associated with the dispensing system, including a local or a remote user interface.

At step 606, an adjustment is caused to the air pressure in the air flow path based on the electronic signal from the electronic pressure sensor. The adjustment to the air pressure may be additionally or alternatively based on the air pressure setpoint. For example, the adjustment may be based on a comparison of the measured air pressure in the air flow path to the pressure setpoint. Other control techniques may be used, such as closed loop control (e.g., a PID controller).

The transducer of the pressure control assembly may be used to adjust the air pressure in the air flow path. The air pressure may be adjusted by transmitting an electronic control signal to the transducer. The transducer may alter the pressure in the air flow path based on the received electronic control signal. The transducer may comprise a voltage-to-pressure transducer or a current-to-pressure transducer. As such, the electronic control signal may comprise a voltage signal or a current signal. The electronic pressure sensor may be positioned in the air flow path downstream from the transducer. Thus, the air pressure measured by the electronic pressure sensor may be regulated air flow (as opposed to the air flow initially received from the external air supply).

The pressure adjustment and/or the electronic control signal to the transducer may be displayed on the user interface. One or more of the pressure setpoint, the measured air pressure in the air flow path, the electronic signal from the electronic pressure sensor indicative of the measured air pressure, the pressure adjustment, or the electronic control signal to the transducer may be recorded and stored. For example, the controller may record such data in a log stored by the controller. The logs may be used for various analytics, such as diagnostic, quality control, or process control analysis.

One skilled in the art will appreciate that the systems and methods disclosed herein may be implemented via a computing device that may comprise, but are not limited to, one or more processors, a system memory, and a system bus that couples various system components including the processor to the system memory. For example, a computing device (e.g., a controller) may comprise one or more processors and memory storing instructions that, when executed by the one or more processors, effectuate one or more of the various methods and techniques described herein.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A hot melt liquid dispensing system, comprising:
a pump configured to pump hot melt liquid to an applicator;
an air flow path configured to supply pressurized air to the pump;
an electronic pressure sensor associated with the air flow path;
a pressure control assembly that includes a transducer and is configured to control an air pressure in the air flow path supplied to the pump wherein the transducer is configured to cause adjustment to an air pressure of the air flow path, wherein the transducer is configured to provide a pneumatic output to the air flow path that is proportional to an electronic signal that is transmitted to the transducer, whereby the transducer is configured to output adjusted air to the pump via the air flow path, and wherein the transducer comprises at least one of a current-to-pressure transducer or a voltage-to-pressure transducer;
a pressure discharge valve; and
a controller configured to:
receive an electronic signal from the electronic pressure sensor indicative of the air pressure in the air flow path,
cause adjustment to the air pressure in the air flow path based on the electronic signal from the electronic pressure sensor by transmitting an electronic signal to the pressure control assembly, wherein the controller causes adjustment to the air pressure in the air flow path by transmitting an electronic signal to the transducer,
wherein the electronic pressure sensor is positioned in the air flow path downstream from the transducer, wherein a regulator of the pressure control assembly is configured to adjust pressure of an unregulated input air supply and output a regulated air supply to the pump via a first air line and a second air line,
wherein the regulator and the transducer are each spaced from the pump,
wherein the first air line is configured to fluidly connect the regulator to the pressure discharge valve, and
wherein the second air line is configured to fluidly connect the regulator to the pump.

2. The hot melt liquid dispensing system of claim 1, wherein the pneumatic output to the air flow path is linearly proportional to the electronic signal that is transmitted to the transducer.

3. The hot melt liquid dispensing system of claim 1, wherein a regulator of the pressure control assembly is configured to output the regulated air supply to a pump air valve via the first air line and the second air line,
wherein the first air line fluidly connects the regulator to the pressure discharge valve, and
wherein the second air line fluidly connects the regulator to the pump air valve, such that the second air line is configured to fluidly connect the regulator to the pump via the pump air valve.

4. The hot melt liquid dispensing system of claim 1, wherein the controller is further configured to store at least one of the air pressure in the air flow path or the adjustment to the air pressure.

5. The hot melt liquid dispensing system of claim 1, wherein the electronic pressure sensor comprises at least one of a pressure-to-current transducer or a pressure-to-voltage transducer.

6. The hot melt liquid dispensing system of claim 1, wherein the controller is further configured to receive an air pressure setpoint and the adjustment to the air pressure in the air flow path is further based on the air pressure setpoint.

7. The hot melt liquid dispensing system of claim 6, wherein the air pressure setpoint is received via a user interface associated with the hot melt liquid dispensing system, and wherein the controller is configured to create and store correlated records of air pressure adjustments by the transducer and air pressure measurements from the electronic pressure sensor.

8. The hot melt liquid dispensing system of claim 7, wherein the user interface comprises a user interface of a remote control device.

9. The hot melt liquid dispensing system of claim 7, wherein the controller is further configured to cause display of the air pressure in the air flow path via the user interface.

10. The hot melt liquid dispensing system of claim 1, wherein the first air line comprises a first tube or hose that fluidly connects the regulator to the pressure discharge valve, and wherein the second air line comprises second a tube or hose that fluidly connects the regulator to a pump air valve.

11. A method for air pressure control in a hot melt liquid dispensing system, the method comprising:
receiving an electronic signal from an electronic pressure sensor indicative of an air pressure in an air flow path configured to supply pressurized air to a pump of the hot melt liquid dispensing system; and
causing adjustment to the air pressure in the air flow path based on the electronic signal from the electronic pressure sensor by transmitting an electronic signal to a pressure control assembly that includes a transducer and that is configured to control the air pressure of the air flow path supplied to the pump, wherein causing adjustment to the air pressure in the air flow path comprises transmitting an electronic signal to the transducer, which is configured to cause adjustment to the air pressure of the air flow path, wherein the transducer provides a pneumatic output to the air flow path that is proportional to the electronic signal that is transmitted to the transducer, whereby the transducer outputs adjusted air to the pump via the air flow path, and wherein the transducer comprises at least one of a current-to-pressure transducer or a voltage-to-pressure wherein the electronic pressure sensor is positioned in the air flow path downstream from the transducer,
wherein the electronic pressure sensor is positioned in the air flow path downstream from the transducer, wherein a regulator of the pressure control assembly is configured to adjust pressure of an unregulated input air supply and output a regulated air supply to the pump via a first air line and a second air line,
wherein the regulator and the transducer are each spaced from the pump,
wherein the first air line fluidly connects the regulator to a pressure discharge valve, and
wherein the second air line fluidly connects the regulator to the pump.

12. The method of claim 11, wherein the pneumatic output to the air flow path is linearly proportional to the electronic signal that is transmitted to the transducer.

13. The method of claim 11, further comprising storing at least one of the air pressure in the air flow path or the adjustment to the air pressure.

14. The method of claim 11, further comprising:

receiving an air pressure setpoint, wherein the adjustment to the air pressure in the air flow path is further based on the air pressure setpoint; and identifying correlating relationships by analyzing quality control metrics with a corresponding pressure setpoint record, a corresponding pressure adjustment record, and/or a corresponding pressure measurement record.

15. The method of claim 14, wherein the air pressure setpoint is received via a user interface associated with the hot melt liquid dispensing system.

16. The method of claim 15, further comprising causing display of the air pressure in the air flow path via the user interface.

* * * * *